United States Patent [19]
Dokurno et al.

[11] Patent Number: 4,847,317
[45] Date of Patent: Jul. 11, 1989

[54] FILLED THERMOPLASTIC POLYMER COMPOSITIONS

[75] Inventors: Mark G. Dokurno, Camlachie; David A. Harbourne; Evelyn M. Lundhild, both of Kingston, all of Canada

[73] Assignee: Du Pont Canada, Inc., Mississauga, Canada

[21] Appl. No.: 76,523

[22] Filed: Jul. 22, 1987

[30] Foreign Application Priority Data

Jul. 25, 1986 [GB] United Kingdom ............... 8618189

[51] Int. Cl.$^4$ ..................... C08K 3/26; C08K 3/10; C08K 3/22
[52] U.S. Cl. ..................... 524/424; 524/425; 524/427; 524/436; 524/437; 524/456; 524/505
[58] Field of Search ............... 524/504, 424, 425, 437, 524/436, 456, 427

[56] References Cited

U.S. PATENT DOCUMENTS

| Re. 31,992 | 9/1985 | Ancker et al. | 524/425 |
| 3,956,230 | 5/1976 | Gaylord | 524/425 |
| 4,031,062 | 6/1977 | Shirayama et al. | 525/285 |
| 4,338,228 | 7/1982 | Inoue et al. | 525/78 |
| 4,387,188 | 6/1983 | Statz | 524/504 |
| 4,420,580 | 12/1983 | Herman et al. | 524/425 |
| 4,433,073 | 2/1984 | Sano et al. | 525/78 |
| 4,477,617 | 10/1984 | Murphy | 524/377 |
| 4,487,885 | 12/1984 | Adur et al. | 525/74 |

FOREIGN PATENT DOCUMENTS 0171513 2/1986 European Pat. Off. .

OTHER PUBLICATIONS

Derwent ABS C85-132604 (85-306737/49) J60212441 Oct. 1985 Mitsui Petro Ind KK.

Primary Examiner—Herbert J. Lilling

[57] ABSTRACT

Filled thermoplastic compositions are disclosed. The compositions comprise (a) 30 to 90 parts of homopolymers of ethylene and/or copolymers of ethylene and C3–C10 alpha-olefins, (b) 10 to 70 parts of homopolymers of ethylene and/or copolymers of ethylene and C4–C10 alpha-olefins modified by grafting with ethylenically unsaturated carboxylic acids or anhydrides thereof, the blend of (a) and (b) having a melt index of less than 15 dg/min. and (c) 20 to 70 percent, based on the amount of (a) and (b) of a filler. The filler is selected from magnesium hydroxide, calcium hydroxide, aluminum trihydrate and hydroxyl-containing carbonates of at least one of magnesium and calcium, and mixtures thereof. The compositions exhibit a useful combination of stiffness and toughness, especially as measured by impact strength and tensile strength.

29 Claims, No Drawings

FILLED THERMOPLASTIC POLYMER COMPOSITIONS

The present invention relates to filled thermoplastic polymer compositions and especially to filled polyolefin compositions adapted to be fabricated into articles having stiffness and toughness properties that are superior to those obtained with articles of the un-filled polyolefin; as used herein toughness refers in particular to ultimate tensile strength and impact strength properties. The fillers are hydroxyl-containing fillers.

Polyolefins are used in a wide variety of end-uses, including in the form of film, fibres, moulded or thermoformed articles, pipe and/or coatings. In some end-uses, especially when the polyolefin is fabricated into articles by moulding or thermoforming techniques, it is important that the fabricated article exhibit stiffness and toughness properties that are superior to those obtainable from the polyolefin per se. Techniques for modification of the properties of polyolefins are known, including cross-linking the polymer or incorporating additives or fillers into the polymer. Articles formed from filled thermoplastic polymer compositions tend to exhibit a higher stiffness than articles manufactured from the corresponding un-filled polymer, but such an increase in stiffness with filled compositions is usually accompanied by a decrease in other important properties, including toughness.

Filled thermoplastic polymer compositions containing a so-called "reinforcement promoter" are known. The expression "reinforcement promoter" is defined in Canadian patent No. 1 173 988 of F. H. Ancker et al., which issued Sept. 04, 1984 as referring to chemicals which provide both improved tensile strength and ductility to a filled thermoplastic polymer, compared with the filled thermoplastic polymer in the absence of the reinforcement promoter. The use of a reinforcement promoter having at least two reactive olefinic double bonds is disclosed in the patent.

A number of techniques for increasing adhesion between filler particles and the polymer matrix have been proposed. Such techniques include the use of cross-linking reactions, depositing a polymerization catalyst on the filler particle and then forming the polymer directly onto the filler, coating the filler particles with a layer of crosslinked polymer especially in a melt compounding process, the use of maleic anhydride in the presence of a peroxide-free radical initiator as the coupling system, and the use of silane or titanate coupling agents. Such techniques are discussed in greater detail in the aforementioned patent of F. H. Ancker et al.

As noted by F. H. Ancker et al., the terminology in the literature is often ambiguous or even erroneous. For instance, the terms "coupling agent" and "adhesion promoter", which imply increased adhesion or bonding between filler particles and the polymer matrix are used without evidence of bonding between particle and polymer matrix, including in situations where the additive may be merely a dispersing aid or a processing aid.

U.S. Pat. No. 3 956 230 of N. G. Gaylord, which issued May 11, 1976 discloses hydroxyl-containing filler reinforced polymers, e.g. polyolefins. The filler is made compatible with the polymer by admixing polymer and filler in the presence of a coupling agent such as maleic anhydride and a free radical initiator. It is exemplified that clay-filled polyethylene has lower impact strength than unfilled polyethylene at filler levels of less than about 50% by weight of the composition. U.S. Pat. No. 4,031,062 of K. Shirayama et al., which issued Sept. 26, 1974 discloses compositions of high adhesive strength formed from polyolefin, unsaturated aliphatic carboxylic acid or anhydride and magnesium oxide.

In Japanese patent application No. 55,112,248, published Aug. 29, 1980 H. Nakae et al. disclose compositions comprising 50-300 parts of particulate inorganic compound, per 100 parts of polyolefin, and 1-50 parts of maleic polymer per 100 parts of inorganic compound. Polyethylene having a density of 0.910 to 0.945 g/cm$^3$ and a melt index of 0.01 to 2.0 dg/min. is the preferred polyolefin. Maleic polymer is defined as polymer containing succinic acid groups, especially maleic polybutadiene and polypropylene graft-modified with maleic anhydride. The maleic polymers are stated to be of relatively low molecular weight, preferably 1000-5000, and to melt and soften at less than 100° C. The compositions are stated to exhibit improved elongation compared with related compositions that do not contain maleic polymer.

Published European patent application No. 0,171,513 of T. M. Krigas et al, published 1986 Feb. 19, discloses filled polyolefin compositions in which the filler is a Group IIA metal carbonate. The compositions contain one or more polyolefins grafted with carboxylic acids or anhydrides as compatibilizing agents. The filler may be present in amounts of up to 80% by weight of the composition and the graft copolymer may be present in amounts of 1-50% by weight of the filler.

It has now been found that compositions of improved impact strength, ultimate tensile strength and flexural modulus may be formed from a modified polymer admixed with un-modified polymer and certain hydroxyl-containing basic fillers.

Accordingly, the present invention provides a composition comprising:

(a) 30 to 90 parts by weight of a polyolefin selected from the group consisting of homopolymers of ethylene and copolymers of ethylene with at least one $C_3$-$C_{10}$ alpha-olefin, and mixtures thereof; (b) 10 to 70 parts by (b) 10 to 70 parts by weight of a modified polyethylene, said polyethylene being selected from the group consisting of homopolymers of ethylene and copolymers of ethylene with at least one $C_4$-$C_{10}$ alpha-olefin, and mixtures thereof, said polyethylene having been modified by grafting at least one of an ethylenically unsaturated carboxylic acid and an ethylenically unsaturated carboxylic acid anhydride onto said polyethylene such that the resultant modified polyethylene contains a total amount of between 0.2 and 2 percent by weight, based on the weight of polyethylene, of said acid and said anhydride, said polyolefin and modified polyolefin being selected such that (a) and (b) form a blend having a melt index of less than 20 dg/min.; and (c) 20 to 70 percent by weight of the combined amount of (a) and (b) of at least one filler selected from the group consisting of magnesium hydroxide, calcium hydroxide, alumina trihydrate, hydroxyl-containing carbonates of magnesium and hydroxyl-containing carbonates of calcium, the amount of filler and modified polyolefin being selected such that the total amount of said acid and said anhydride is in the range of 0.1 to 4 percent by weight of filler.

In a preferred embodiment of the composition of the present invention, the ethylenically unsaturated carboxylic acid is maleic acid and the ethylenically unsaturated carboxylic acid anhydride is maleic anhydride.

The present invention also provides a process for the manufacture of a polyolefin composition, comprising:

(i) feeding to apparatus adapted for the admixing of molten thermoplastic polymers with other materials, an admixture of:

(a) 30 to 90 parts by weight of a polyolefin selected from the group consisting of homopolymers of ethylene and copolymers of ethylene with at least one $C_3$–$C_{10}$ alpha-olefin, and mixtures thereof;

(b) 10 to 70 parts by weight of a modified polyethylene, said polyethylene being selected from the group consisting of homopolymers of ethylene and copolymers of ethylene with at least one $C_4$–$C_{10}$ alpha-olefin, and mixtures thereof, said polyethylene having been modified by grafting at least one of an ethylenically unsaturated carboxylic acid and an ethylenically unsaturated carboxylic acid anhydride onto said polyethylene such that the resultant modified polyethylene contains a total amount of between 0.2 and 2 percent by weight, based on the weight of polyethylene, of said acid and said anhydride, said polyolefin and modified polyolefin being selected such that (a) and (b) form a blend having a melt index of less than 20 dg/min.; and (c) 20 to 70 percent by weight of the combined amount of (a) and (b) of at least one filler selected from the group consisting of magnesium hydroxide, calcium hydroxide, alumina trihydrate, hydroxyl-containing carbonates of magnesium and hydroxyl-containing carbonates of calcium, the amount of filler and modified polyolefin being selected such that the total amount of said acid and said anhydride is in the range of 0.1 to 4 percent by weight of filler;

(ii) admixing (a), (b) and (c) at a temperature above the melting point of the polymers of (a) and (b), said temperature being below the temperature of decomposition of both said filler and the polymers of (a) and (b), and (iii) extruding from the apparatus a composition formed from (a), (b) and (c).

The present invention also provides a process for the manufacture of articles comprising the steps of feeding a composition to extrusion or injection-moulding apparatus, and forming said article by extruding said composition into a shaped article or by injecting said composition into a mould and cooling the article so moulded, said composition comprising:

(a) 30 to 90 parts by weight of a polyolefin selected from the group consisting of homopolymers of ethylene and copolymers of ethylene with at least one $C_3$–$C_{10}$ alpha-olefin, and mixtures thereof;

(b) 10 to 70 parts by weight of a modified polyethylene, said polyethylene being selected from the group consisting of homopolymers of ethylene and copolymers of ethylene with at least one $C_4$–$C_{10}$ alpha-olefin, and mixtures thereof, said polyethylene having been modified by grafting at least one of an ethylenically unsaturated carboxylic acid and an ethylenically unsaturated carboxylic acid anhydride onto said polyethylene such that the resultant modified polyethylene contains a total amount of between 0.2 and 2 percent by weight, based on the weight of polyethylene, of said acid and said anhydride, said polyolefin and modified polyolefin being selected such that (a) and (b) form a blend having a melt index of less than 20 dg/min.; and (c) 20 to 70 percent by weight of the combined amount of (a) and (b) of at least one filler selected from the group consisting of magnesium hydroxide, calcium hydroxide, alumina trihydrate, hydroxyl-containing carbonates of magnesium and hydroxyl-containing carbonates of calcium, the amount of filler and modified polyolefin being selected such that the total amount of said acid and said anhydride is in the range of 0.1 to 4 percent by weight of filler.

The polyolefin of the composition of the present invention is formed from homopolymers of ethylene and/or copolymers of ethylene with at least one $C_3$–$C_{10}$ hydrocarbon alpha-olefin. Examples of such alpha-olefins are propylene, butene-1, hexene-1 and octene-1. When the polyolefin is a homopolymer of ethylene or a copolymer of ethylene and a minor amount of at least one $C_3$–$C_{10}$ hydrocarbon alpha-olefin, the density of the polyolefin will normally be in the range of 0.898 to 0.965 g/cm$^3$, especially in the range 0.940 to 0.960 g/cm$^3$, and the melt index will preferably be less than 15 dg/min. In preferred embodiments, the density of the polyolefin, when an ethylene homopolymer or copolymer of ethylene and a minor amount of the hydrocarbon alpha-olefin, is in the range of 0.940 to 0.960 g/cm$^3$ and the melt index is in the range of 3 to 8 dg/min. In other embodiments, the polymer is a copolymer of propylene and a minor amount of ethylene.

The density and melt index of the polyolefin will depend, in particular, on the actual type of polymer, as the relationship between for instance density and stiffness is a function of the type of polymer, and on the intended end-use of the articles formed e.g. by injection moulding techniques, from the compositions. Higher densities will tend to give relatively stiff articles whereas lower densities will tend to give more flexible articles.

The compositions of the invention also contain a modified polyethylene. The polyethylene of the modified polyethylene is a homopolymer of ethylene and/or a copolymer of ethylene and at least one $C_4$–$C_{10}$ hydrocarbon alpha-olefin. Examples of such alpha-olefins are butene-1, hexene-1 and octene-1. The polyethylene is modified by grafting the polyethylene with at least one of an ethylenically unsaturated carboxylic acid and an ethylenically unsaturated carboxylic acid anhydride. Preferably the acid is maleic acid and the anhydride is maleic anhydride. The polyethylene that is modified by grafting should have a density of at least 0.940 g/cm3 and preferably at least 0.955 g/cm$^3$, especially as the filled compositions formed using such modified polyethylene tend to exhibit flexural modulus properties that are superior to the unfilled polymer.

Techniques for the preparation of grafted copolymers are known in the art, preferred examples of which are disclosed in published European patent application No. 0,172,650 of G. White, published February 26, 1986 and in U.S. Pat. No. 4 612 155 of C. S. Wong and R. A. Zelonka, which issued Sept. 16, 1986. Grafted copolymers may also be prepared by the thermal reaction of maleic anhydride with polyethylene or elastomers at temperatures of at least about 375° C. In addition grafted copolymers are available commercially from Mitsui Petrochemical Industries under the trademark Admer.

The modified polyethylene should have between 0.2 and 2 percent, based on the weight of polyethylene, of the acid and anhydride, especially between 0.5 and 1 percent of acid and anhydride, bound to the backbone polyethylene.

The compositions of the invention contain 30 to 90 parts by weight of the composition of the polyolefin and 10 to 70 parts by weight of the composition of modified polyethylene, especially 55 to 75 parts of polyolefin and 25 to 45 parts of the modified polyethylene. Sufficient modified polyethylene is used so that the resultant compositions contain a total of between 0.02 and 1.4 percent by weight, based on the combined weight of polyolefin and modified polyethylene, of ethylenically unsaturated carboxylic acid and ethylenically unsaturated carboxylic acid anhydride, and especially 0.1 to 0.5 percent of said acid and said anhydride, such acid and anhydride being bound to the backbone polyethylene of the modified polyethylene. There are indications e.g. from scanning electron microscopy, that the use of the modified polymer results in improved adhesion between filler and polymer.

The polyolefin and modified polyethylene are selected in type and amount such that a blend thereof would have a melt index of less than 20 dg/min., especially less than 15 dg/min and in particular in the range of 5 to 8 dg/min.

The compositions of the invention also contain 20 to 70 percent by weight of the combined amount of polyolefin and modified polyethylene of at least one filler selected from the group consisting of magnesium hydroxide, calcium hydroxide, aluminum trihydrate, hydroxyl-containing carbonates of magnesium and hydroxyl-containing carbonates of calcium. The latter two types of fillers are fillers that have —OH groups as part of the compound, other than in the form of water of hydration. Such fillers may be naturally-occurring mixtures of hydroxides and carbonates. Examples of mixed hydroxides and carbonates are synthetic hydrotalcite and Hydracarbon TM filler, the latter being available from Aluchem, Inc. of Reading, Ohio, U.S.A. and being a mixed magnesium carbonate/calcium carbonate/magnesium hydroxide. In a preferred embodiment, the filler is magnesium hydroxide. In other embodiments, the compositions contain between 20 and 40 percent by weight of filler. The particle size of the filler may be important, as is known in the art. Fine particle size fillers tend to provide products of higher impact strength than larger particle size fillers.

In embodiments of the compositions of the present invention, the compositions may additionally contain another filler. For instance, the compositions may contain 5 to 30 percent by weight of the combined amount of polyolefin and modified polyethylene of another filler e.g. talc and/or mica. Such additional fillers may be used to further stiffen articles made from compositions of the invention, but the impact strength of the articles may decrease as the additional fillers may not interact with the grafted polyethylene as effectively, if at all, compared to the fillers used in the compositions of the invention.

The compositions may be manufactured by feeding the components of the composition to apparatus adapted for the admixing of thermoplastic compositions. In particular, such components may be fed to a twin-screw extruder, a high intensity fluxing mixer e.g. a Gelimat TM mixer or a Farrel TM continuous mixer. All of such apparatus is adapted for intensive mixing or compounding of compositions. The apparatus is operated at temperatures above the melting point of the polymers of (a) and (b) viz. polyolefin and modified polyethylene, but below the temperature of decomposition of both the filler and the polymers of (a) and (b). It is to be understood that if the composition contains more than one filler, the temperature is less than the lowest temperature of decomposition of the fillers. For example, the temperature should not be above about 200° C. when the compositions contain alumina trihydrate.

After admixing the compositions, the compositions may be fed directly to apparatus for the manufacture of articles, especially injection moulding apparatus or apparatus for the extrusion of sheet or other profiles or blow moulding apparatus. However, the compositions will usually be first formed into comminuted shapes, for example, into pellets and other comminuted shapes, and subsequently fed to apparatus for the manufacture of articles.

The compositions may be subjected to a number of processes, especially injection moulding processes, sheet-forming or blow moulding processes. In particular, the compositions may be injection moulded into articles that have a useful combination of toughness and stiffness for many end-uses. Articles made from compositions of the invention using injection moulding processes may find use in, for instance, safety helmets, sporting equipment, personal protective equipment, rigid packaging, tools, transportation, materials handling and appliances.

The present invention is illustrated by the following examples:

EXAMPLE I

A number of compositions were made from SCLAIR TM 2907 polyethylene, which is an ethylene homopolymer having a density of 0.960 g/cm$^3$ and a melt index of 5.0 dg/min. The compositions were made using the method described above for the preparation of compositions of the invention, from the polyethylene and one or more of the following:

(a) Kisuma 5B TM, which is a magnesium hydroxide filler obtained from Kyowa Chemicals Ltd. of Japan;

(b) Talc, obtained from Pfizer as MP-12-50;

(c) Clay, obtained from J. M. Huber Corp. as 70 C;

(d) MA-g-2909, an experimental grafted polymer formed by melt grafting polyethylene with 0.6% by weight of maleic anhydride, the polyethylene being SCLAIR 2909 polyethylene, a homopolymer of ethylene having a density of 0.960 g/cm$^3$ and a melt index of 13.5 dg/min.;

(e) MA-g-2113, an experimental grafted polymer formed by melt grafting polyethylene with 0.6% by weight of maleic anhydride, the polyethylene being SCLAIR 2113 polyethylene, an ethylene/butene-1 copolymer having a density of 0.924 g/cm$^3$ and a melt index of 29 dg/min.;

(f) MA-g-PE, a polyethylene of melt index 12 dg/min. that had been melt grafted with 1.0% by weight of maleic anhydride;

(g) mica, obtained from Marietta Resources as Suzorite 200 H;

(h) DHT-4A synthetic hydrotalcite ($Mg_{4.5}Al_2(OH)_{13}CO_3 \cdot 3.5H_2O$) obtained from Kyowa Chemicals Ltd. of Japan;

(i) calcium carbonate, mean particle size 0.7 microns, obtained from Piizer as Superpflex TM; and (j) technical grade magnesium hydroxide, obtained from Ventron Corp.

Notched Izod impact strength was measured at 23° C. using the procedure of ASTM D-256. The bars used, which were injection moulded at 290° C., had a thickness of 0.32 cm. Flexural modulus was measured at 23° C. using the procedure of ASTM D-790. Tensile strength and elongation were measured using the procedure of ASTM D-638, using Type IV dumbbells specified in that procedure.

Further details and the results obtained are given in Table I.

TABLE I

| Run* No. | Graft Type | Grafted Polymer Amount (%) | Filler Type | Filler Amount (%) |
|---|---|---|---|---|
| 1 | — | — | — | — |
| 2 | — | — | a | 30 |
| 3 | d | 20 | a | 20 |
| 4 | d | 30 | a | 30 |
| 5 | d | 40 | a | 40 |
| 6 | d | 30 | (a) | 30 |
|   |   |    | (b) | 10 |
| 7 | f | 24 | c | 30 |
| 8 | f | 24 | g | 40 |
| 9 | f | 30 | b | 25 |
| 10 | d | 30 | h | 30 |
| 11 | d | 20 | i | 20 |
| 12 | d | 30 | j | 30 |
| 13 | d | 30 | a | 30 |
| 14 | d | 30 | a | 30 |
| 15 | e | 30 | a | 30 |
| 16 | e | 30 | a | 30 |

| Run* No. | Notched Izod Impact Str. (Joules/m) | Flexural Modulus (GPa) | Tensile Strength (MPa) | Elongation at Break (%) |
|---|---|---|---|---|
| 1 | 159 | 1.03 | 24.7 | 840 |
| 2 | 133 | 1.79 | 23.4 | 500 |
| 3 | 424 | 1.24 | — | — |
| 4 | 689 | 1.52 | 32.1 | 74 |
| 5 | 477 | 2.07 | 35.6 | 40 |
| 6 | 318 | 2.41 | 31.2 | 90 |
| 7 | 159 | 2.41 | 30.4 | 8 |
| 8 | 40 | 3.23 | 33.7 | 2 |
| 9 | 44 | 2.32 | 32.1 | 4 |
| 10 | 578 | 1.62 | 31.2 | 8 |
| 11 | 347 | 1.27 | 19.6 | 960 |
| 12 | 318 | 1.45 | 28.9 | 56 |
| 13 | 265 | 1.66 | — | — |
| 14 | 106 | 1.66 | — | — |
| 15 | 64 | 1.35 | — | — |
| 16 | 721 | 0.75 | — | — |

*The tensile impact strength, as measured by the procedure of ASTM D-1822, was determined for the compositions of Runs 3, 4 and 6. The results were 226, 198 and 156 kJ/m², respectively;
The data for each of Runs 1, 4 and 12 is the average for several runs;
In Run 13 the polyethylene was SCLAIR 2909;
In Run 14 the polyethylene was SCLAIR 2914, an ethylene homopolymer having a density of 0.960 g/cm³ and a melt index of 50 dg/min;
In Run 15 the polyethylene was replaced with PROFAX TM 6431 polypropylene obtained from Himont Inc., a propylene homopolymer having a density of 0.92 g/cm³ and a melt flow of 6.5 dg/min; and In Run 16 the polyethylene was replaced with PROFAX 7523 polypropylene obtained from Himont Inc., a propylene/ethylene copolymer having a density of 0.898 g/cm³ and a melt flow of 5 dg/min.

In this example:

Run 1 is a comparative example illustrating the properties of polyethylene;

Run 2 is a comparative example illustrating the properties of polyethylene filled with magnesium hydroxide;

Runs 3 to 5 illustrate compositions of the invention, and show higher notched Izod values higher than those of either Run 1 or Run 2 and higher stiffness than Run 1;

Run 6 shows the effect of the addition of talc viz. increased stiffness and decreased impact strength;

Runs 7 to 9 are comparative runs showing the effects of using other fillers;

Runs 10 to 12 illustrate the use of fillers other than $Mg(OH)_2$ in the compositions of the invention, Run 11 being a comparative run using calcium carbonate;

Runs 13 and 14 illustrate the effect of increasing the melt index of the polyethylene, Run 14 being a comparative run; and Runs 15 and 16 illustrate the effect of replacing the polyethylene with polypropylene, Run 15 being a comparative run showing the poorer results obtained with homopolymer polypropylene, compared with those obtained in Run 16 using propylene/ethylene copolymer.

This example illustrates that compositions of the invention exhibit higher impact strength and tensile strength than either unfilled polyethylene or filled polyethylene that does not contain modified polyethlene. The compositions of the invention do, however, exhibit low values of elongation. The example further illustrates the importance of using the fillers defined with respect to the invention. Comparative compositions prepared using calcium carbonate as filler showed improved impact strength but poorer tensile strength than unfilled polymers, whereas clay mica and talc fillers did not provide the improved impact strength of the invention.

EXAMPLE II

A number of compositions were made from either Profax SB861 polypropylene or Profax 7623 polypropylene. The compositions were made using the method described above for the preparation of compositions of the invention.

The compositions were made using the following propylene/ethylene copolymers:

(k) Profax SB861 polypropylene which is a propylene copolymer having a density of 0.898 g/cm³ and a melt index of 0.8 dg/min;

(l) Profax 7623 polypropylene which is a propylene copolymer having a density of 0.898 g/cm3 and a melt index of 2.0 dg/min.

In addition, the experimental grafted polymer MA-g-2909 described as (d) in Example I and Kisuma 5B magnesium hydroxide filler described as (a) in Example I were used.

Further experimental details and the results obtained are given in Table II.

This example shows that compositions of propylene copolymers exhibit the improved impact strength and tensile strength shown by the compositions of the invention in Example I.

EXAMPLE III

A series of runs were carried out in which fillers were incorporated into SCLAIR 2907 polyethylene, an ethylene homopolymer having a density of 0.960 g/cm³ and a melt index of 5 dg/min, using the method described above for the preparation of compositions of the invention. The graft polymer used was MA-g-2909, which has been described above. The fillers used were:

(m) Hydracarb from Aluchem, a mixed magnesium carbonate/calcium carbonate/magnesium hydroxide;

Dolocron TM 15-16 from Pfizer, a mixed magnesium and calcium carbonate; and (p) Light magnesium carbonate No. 12 from Lindemann GmbH.

Further experimental details and the results obtained are given in Table III.

TABLE II

| Run No. | 17 | 18 | 19 | 20 | 21 | 22 | 23 | 24 |
|---|---|---|---|---|---|---|---|---|
| Polypropyl- | k | k | l | l | k | k | l | l |

TABLE II-continued

| Run No. | 17 | 18 | 19 | 20 | 21 | 22 | 23 | 24 |
|---|---|---|---|---|---|---|---|---|
| ene type | | | | | | | | |
| Amount of polypropylene (%) | 50 | 40 | 50 | 40 | 100 | 57 | 100 | 55 |
| Amount of graft polymer (%) | 20 | 20 | 20 | 20 | — | 23 | — | 22 |
| Amount of filler (%) | 30 | 40 | 30 | 40 | — | 20 | — | 23 |
| Notched Izod impact strength (Joules/m) | 363 | 315 | 438 | 278 | 100 | 622 | 180 | 197 |
| Flexural modulus (GPa) | 1.32 | 1.72 | 1.37 | 1.78 | 0.99 | 1.35 | 0.90 | 1.23 |
| Ultimate tensile strength (MPa) | | | | | | 27.5 | 28.2 | 23.7 | 24.1 |
| Elongation at break (%) | | | | | | 630 | 280 | 610 | 25 |

TABLE III

| Run No.* | 25 | 26 | 27 | 28 | 29 |
|---|---|---|---|---|---|
| Amount of polyethylene | 40 | 70 | 40 | 40 | 70 |
| Amount of graft polymer (%) | 30 | — | 30 | 30 | — |
| Type of filler | m | m | n | p | p |
| Amount of filler | 30 | 30 | 30 | 30 | 30 |
| Notched Izod impact strength (Joules/m) | 416 | 27 | 133 | 75 | 21 |
| Flexural modulus (GPa) | 1.60 | 2.02 | 1.63 | 1.73 | 1.82 |
| Ultimate tensile strength (MPa) | 30.8 | 26.9 | 30.0 | — | — |
| Elongation at break (%) | 73 | 89 | 120 | — | — |

*Run 25 is of the invention, and illustrates the improved impact strength obtained with compositions of the invention; the remainder of the runs are comparative runs.

We claim:
1. A composition consisting essentially of:
   (a) 30 to 90 parts by weight of a polyolefin selected from the group consisting of homopolymers of ethylene and copolymers of ethylene with at least one $C_3$–$C_{10}$ hydrocarbon alpha-olefin, and mixtures thereof;
   (b) 10 to 70 parts by weight of a modified polyethylene, said polyethylene being selected from the group consisting of homopolymers of ethylene and copolymers of ethylene with at least one $C_4$–$C_{10}$ hydrocarbon alpha-olefin, and mixtures thereof, said polyethylene having been modified by grafting at least one of an ethylenically unsaturated carboxylic acid and an ethylenically unsaturated carboxylic acid anhydride onto said polyethylene such that the resultant modified polyethylene contains a total amount of between 0.2 and 2 percent by weight, based on the weight of polyethylene, of said acid and said anhydride, said polyolefin and modified polyolefin being selected such that (a) and (b) form a blend having a melt index of less than 20 dg/min.; and
   (c) 20 to 70 percent by weight of the combined amount of (a) and (b) of at least one filler selected from the group consisting of magnesium hydroxide, calcium hydroxide, alumina trihydrate, hydroxyl-containing carbonates of magnesium and hydroxyl-containing carbonates of calcium, the amount of filler and modified polyolefin being selected such that the total amount of said acid and said anhydride is in the range of 0.1 to 4 percent by weight of filler.

2. The composition of claim 1 in which the ethylenically unsaturated carboxylic acid is maleic acid and the ethylenically unsaturated carboxylic acid anhydride is maleic anhydride.

3. The composition of claim 2 in which the polyolefin is a homopolymer of ethylene.

4. The composition of claim 2 in which the polyolefin is a copolymer of ethylene and a minor amount of a $C_3$–$C_{10}$ hydrocarbon alpha-olefin.

5. The composition of claim 3 in which the polyolefin has a density of 0.940–0.960 $g/cm^3$.

6. The composition of claim 4 in which the polyolefin has a density of 0.940–0.960 $g/cm^3$.

7. The composition of claim 2 in which the, polyolefin is a copolymer of propylene and a minor amount of ethylene.

8. The composition of claim 2 in which the modified polyethylene is formed from a polymer having a density of at least 0.940 $g/cm^3$.

9. The composition of claim 2 in which the amount of ethylenically unsaturated carboxylic acid and anhydride groups is 0.02–1.4% by weight of the polyolefin and polyethylene.

10. The composition of claim 1 in which the melt index of the blend of (a) and (b) is less than 15 dg/min.

11. The composition of claim 10 in which said melt index is in the range 5–8 dg/min.

12. The composition of claim 1 in which the composition contains 5–30% by weight of another filler.

13. A process for the manufacture of a polyolefin composition, consisting essentially of:
   (i) feeding to apparatus adapted for the admixing of molten thermoplastic polymers with other materials, an admixture of:
   (a) 30 to 90 parts by weight of a polyolefin selected from the group consisting of homopolymers of ethylene and copolymers of ethylene with at least one $C_3$–$C_{10}$ hydrocarbon alpha-olefin, and mixtures thereof;
   (b) 10 to 70 parts by weight of a modified polyethylene, said polyethylene being selected from the group consisting of homopolymers of ethylene and copolymers of ethylene with at least one $C_4$–$C_{10}$ hydrocarbon alpha-olefin, and mixtures thereof, said polyethylene having been modified by grafting at least one of an ethylenically unsaturated carboxylic acid and an ethylenically unsaturated carboxylic acid anhydride onto said polyethylene such that the resultant modified polyethylene contains a total amount of between 0.2 and 2 percent by weight, based on the weight of the polyethylene, of said acid and said anhydride, said polyolefin and modified polyolefin being selected such that (a) and (b) form a blend having a melt index of less than 20 dg/min.; and
   (c) 20 to 70 percent by weight of the combined amount of (a) and (b) of at least one filler selected from the group consisting of magnesium hydroxide, calcium hydroxide, alumina trihydrate, hydroxyl-containing carbonates of magnesium and hydroxyl-containing carbonates of calcium, the amount of filler and modified polyolefin being selected such that the total amount of said acid and said anhydride is in the range of 0.1 to 4 percent by weight of filler;

(ii) admixing (a), (b) and (c) at a temperature above the melting point of the polymers of (a) and (b), said temperature being below the temperature of decomposition of both said filler and polymers of (a) and (b), and (iii) extruding from the apparatus a composition formed from (a), (b) and (c).

14. The process of claim 13 in which the ethylenically unsaturated carboxylic acid is maleic acid and the ethylenically unsaturated carboxylic acid anhydride is maleic anhydride.

15. The process of claim 14 in which the polyolefin is a homopolymer of ethylene.

16. The process of claim 14 in which the polyolefin is a copolymer of ethylene and a minor amount of a $C_3$-$C_{10}$ hydrocarbon alpha-olefin.

17. The process of claim 14 in which the polyolefin is a copolymer of propylene and a minor amount of ethylene.

18. A process for the manufacture of articles comprising the steps of feeding a composition to extrusion or injection-moulding apparatus, and forming said article by extruding said composition into a shaped article or by injecting said composition into a mould and cooling the article so moulded, said composition consisting essentially of:

(a) 30 to 90 parts by weight of a polyolefin selected from the group consisting of homopolymers of ethylene and copolymers of ethylene with at least one $C_3$-$C_{10}$ hydrocarbon alpha-olefin, and mixtures thereof;

(b) 10 to 70 parts by weight of a modified polyethylene, said polyethylene being selected from the group consisting of homopolymers of ethylene and copolymers of ethylene with at least one $C_4$-$C_{10}$ hydrocarbon alpha-olefin, and mixtures thereof, said polyethylene having been modified by grafting at least one of an ethylenically unsaturated carboxylic acid and an ethylenically unsaturated carboxylic acid anhydride onto said polyethylene such that the resultant modified polyethylene contains a total amount of between 0.2 and 2 percent by weight, based on the weight of the polyethylene, of said acid and said anhydride, said polyolefin and modified polyolefin being selected such that (a) and (b) form a blend having a melt index less that 20 dg/min.; and (c) 20 to 70 percent by weight of the combined amount of (a) and (b) of at least one filler selected from the group consisting of magnesium hydroxide, calcium hydroxide, alumina trihydrate, hydroxyl-containing carbonates of magnesium and hydroxyl-containing carbonates of calcium, the amount of filler and modified polyolefin being selected such that the total amount of said acid and said anhydride is in the range of 0.1 to 4 percent by weight of filler.

19. The process of claim 18 in which the ethylenically unsaturated carboxylic acid is maleic acid and the ethylenically unsaturated carboxylic acid anhydride is maleic anhydride.

20. The process of claim 19 in which the polyolefin is a homopolymer of ethylene.

21. The process of claim 19 in which the polyolefin is a copolymer of ethylene and a minor amount of a $C_3$-$C_{10}$ hydrocarbon alpha-olefin.

22. The process of claim 20 in which the polyolefin has a density of 0.940–0.960 g/cm$^3$.

23. The process of claim 21 in which the polyolefin has a density of 0.940–0.960 g/cm$^3$.

24. The process of claim 19 in which the polyolefin is a copolymer of propylene and a minor amount of ethylene.

25. The process of claim 19 in which the modified polyethylene is formed from a polymer having a density of at least 0.940 g/cm$^3$.

26. The process of claim 19 in which the amount of ethylenically unsaturated carboxylic acid and anhydride groups is 0.02–1.4% by weight of the polyolefin and polyethylene.

27. The process of claim 18 in which the melt index of the blend of (a) and (b) is less than 15 dg/min.

28. The process of claim 27 in which said melt index is in the range 5–8 dg/min.

29. The process of claim 18 in which the composition contains 5–30% by weight of another filler.

* * * * *